(12) United States Patent
Miller et al.

(10) Patent No.: US 8,864,206 B2
(45) Date of Patent: Oct. 21, 2014

(54) RECREATIONAL VEHICLE WITH RECONFIGURABLE FLOOR PLAN

(75) Inventors: Ty Miller, Hemet, CA (US); Jeff Burian, Hemet, CA (US)

(73) Assignee: Forest River, Inc., Elkhart, IN (US)

( * ) Notice: Subject to any disclaimer, the term of this patent is extended or adjusted under 35 U.S.C. 154(b) by 687 days.

(21) Appl. No.: 12/288,016

(22) Filed: Oct. 16, 2008

(65) Prior Publication Data

US 2010/0096873 A1  Apr. 22, 2010

(51) Int. Cl.
*B60P 3/07* (2006.01)
*B60P 3/32* (2006.01)

(52) U.S. Cl.
CPC ........................................ *B60P 3/32* (2013.01)
USPC ..................... 296/24.33; 296/24.43

(58) Field of Classification Search
USPC ............... 296/24.4, 24.33, 26.01, 26.09, 172, 296/176, 26.1, 19, 24.43
See application file for complete search history.

(56) References Cited

U.S. PATENT DOCUMENTS

| | | | | | |
|---|---|---|---|---|---|
| 4,155,468 | A | * | 5/1979 | Royce | 414/556 |
| 4,550,946 | A | * | 11/1985 | Hanemaayer | 296/156 |
| 5,120,103 | A | * | 6/1992 | Kave | 296/19 |
| 5,649,803 | A | * | 7/1997 | Bennett | 414/537 |
| 6,135,532 | A | * | 10/2000 | Martin | 296/61 |
| 6,378,927 | B1 | * | 4/2002 | Parry-Jones et al. | 296/61 |
| 2002/0081184 | A1 | * | 6/2002 | Sternberg | 414/537 |
| 2003/0141731 | A1 | * | 7/2003 | Betts et al. | 296/24.1 |

OTHER PUBLICATIONS

Definition of recreation vehicle from thefreedictionary.com Http://www.thefreedictionary.com/recreactioinal+vehicle.*

* cited by examiner

*Primary Examiner* — Glenn Dayoan
*Assistant Examiner* — Melissa A Black
(74) *Attorney, Agent, or Firm* — Barnes & Thornburg LLP

(57) ABSTRACT

A method of making a RV and a RV made thereby having a plurality of compartments whose floorspace ratio can be selectively altered according to the usage status of the vehicle without increasing the total floorspace footprint by internal movement of structural features and user fixtures normally supported on the vehicle floorspace. For example, an RV can be made wherein the relative position of a dividing wall between compartments is movable with respect to those compartments and, at the same time, a seating fixture within one compartment can be moved along the floor between optimizable positions according to the usable floor space within that compartment.

12 Claims, 1 Drawing Sheet

RECREATIONAL VEHICLE WITH RECONFIGURABLE FLOOR PLAN

BACKGROUND OF THE INVENTION

The present invention relates generally to recreational vehicles and, more particularly, to travel trailers and the like having multiple compartments therein. The present invention has particular application to "toy hauler" type trailers having a ramp door leading into a cargo compartment.

"Recreational vehicles" or "RVs," as referred to herein, can be motorized or towed, but in general have a living area which provides shelter from the weather as well as personal conveniences for the user, such as a bathroom(s), bedroom(s), kitchen, dining room, and/or family room. Each of those rooms typically forms a separate compartment within the vehicle. A motorized recreational vehicle is generally referred to as a "motor home," often of type "Class A" or "Class C," for example. A towed recreational vehicle is generally referred to as a "travel trailer," for example. The Recreational Vehicle Industry Association (RVIA) provides more detailed public information about the different types of RVs which have been generally available at its internet web site, www.rvia.org.

In general, consumers have desired to include more and more features in RV designs, adding more rooms and functionality wherever possible. This has resulted in RVs being made with virtually any and/or all of the features found in a conventional house, including, for example, fireplaces, home theaters, queen size beds, and whirlpool baths. The RV can become, in effect, a home away from home, allowing the user to take all of usual the household comforts along wherever he or she goes. Further, the RV can be made to accommodate a number of users, with sleeping quarters for eight or more persons not being uncommon.

In recent years, some travel trailers and motor homes have also evolved to include cargo compartments large enough to carry motorcycles, snowmobiles, and various offroad vehicles which can be loaded into and out of the RV by way of a ramp door that forms part of a vehicle wall when closed. These RVs are typically referred to as "toy haulers," the "toys" being the secondary vehicles taken in the trailer to and from campgrounds, parks, raceways, dunes, and the like for use outside of the trailer. Toy haulers can also be used for various hobbies and to transport portable equipment for user supported events like dog shows, ham radio fests, and the like, since the ramp door gives easy access for large containers and a place for the user to sleep or remain in comfort during the event. Further, some other types of vehicles, such as horse trailers and utility trailers have evolved to include living compartments as well as the animal and cargo compartments, such that they are functionally equivalent to RVs.

To accommodate consumer demand for greater functionality (more versatility, utility, features, accommodation of more users, and/or greater comfort), many RV manufacturers have previously made RVs larger overall. In part, the size increase has been accomplished by adding to the basic height, length, and/or width of the vehicle. Since there are often industry standard width and height dimensions for vehicles, this is often reflected in manufacturers using vehicle length as a means for differentiating functionality and/or models within their product lines. However, there are legal and practical restrictions upon the basic dimensions which vehicles are permitted to have when traveling on the various state and federal road systems. There are also restrictions upon the size of vehicles which users are permitted to drive or tow with common driver's licenses. Further, the larger the basic dimension of the vehicle, the heavier it tends to become. Not only are there weight restrictions for vehicles on some roads, but also heavier vehicles tend to use more fuel, thus becoming more costly to operate.

With respect to towed RVs, there is yet another size restriction to contend with. Many people enjoy the use of "park model travel trailers," "mobile homes," and "manufactured housing." Each of these products can be subject to different manufacturing codes, vehicle movement laws, and taxes. As an RV design becomes larger in size, it can approach the size of park models and mobile homes, for example, in floorspace. While similar in many respects, of course, these products do have somewhat different overall intended purposes, and those differences are part of the reason for the different regulations and laws applicable to them. In general, it is not advantageous in the eyes of many users for an RV to be considered by law as a park model or mobile home. Accordingly, modern RV designs generally do not exceed certain basic dimensions.

Another way to accommodate consumer demand for greater functionality has been for RVs to be designed with "slide outs" from the basic vehicle dimensions. Slide outs are portions of a room which are retracted into the vehicle when not needed or when the vehicle is in motion, and then extended from the vehicle when it is parked and greater room space is desired. Slide outs typically accomplish this by mounting some or all of a side wall of the vehicle on a track, usually including a seating, closet, bed, or kitchen assembly. The track is, for example, aligned with the lateral axis of the vehicle and supports the slide out portion for actuation by an electric or hydraulic motor and/or manual drive mechanism. The track guides and defines the path of the slide out portion for motion inward and outward. A given RV may, for example, include one or more slide outs on one or both lateral sides of the vehicle.

However, certain slide outs can add significantly to the overall weight of the vehicle and are relatively costly to manufacture. Slide outs require not just the side wall portion which would otherwise be present in the trailer, but also additional slide out end walls, roofs, and floors, as well as special weather sealing arrangements, track mounting structure, and motor assemblies. Further, when retracted into the vehicle, those additional structures of slide outs can significantly reduce the useable space of a given room and, for example, thereby create significant inconvenience then the vehicle is used while in motion (if it is a motor home) and/or accessed for a short stop along the road (if it is, for example, a travel trailer).

Even when extended from the vehicle, slide outs have certain limits on the amount of space they can add to the vehicle. First, the maximum space to be gained is physically confined by the room available within a given floor plan for its retracted position. Second, even with slide outs, under current regulations and standards, an RV cannot exceed a specified fully extended "footprint" of floorspace without becoming, in the eyes of the law at least, a park model or mobile home, regardless of basic dimensions of the vehicle when the slide outs are retracted. This footprint is, typically, a specified number of square feet as determined by fully extending all slide outs and measuring the noon shadow created by the vehicle.

Even so, slide outs can allow an RV to be built with smaller basic dimensions to achieve the maximum allowable footprint and thereby increase ease of maneuver and towability when on the road and, in some cases, increase fuel economy and safety. However, in the case of toy haulers the use of slide outs has another limitation: the cargo area. It is usually desirable for the cargo area of toy haulers to be made as wide as possible so as to fit as many or as wide a secondary vehicle as possible. Retracting a slide out into the cargo area could severely restrict the usable space of the cargo area, and thus detract from one of the primary functions of the toy hauler.

In addition, it is often desirable to make the cargo area relatively long so as to fit not just the more stable, wide secondary vehicles, but also longer secondary vehicles capable of supporting a larger number of passengers, or a greater number of wider secondary vehicles. Thus, not only would a slide out be unavailable for use in the cargo area of a toy hauler, there would be less of the rest of the trailer in which a slide out could be used, unless the basic dimensions of the toy hauler was lengthened. That lengthening, however, can detract from one of the primary advantages of slide outs noted above.

For example, in order to accommodate a currently popular type of four passenger dune riding vehicle, toy haulers are preferably made with a 16 foot long cargo compartment. At the same time, in order to provide the toy hauler with some of the currently popular living compartment floor plans, the overall length of the toy hauler needs to be 46 feet. However, a 46 foot long trailer is classified as a "big rig" in some states, requiring special licensing and/or towing vehicle types and/or additional usage fees. Reducing the trailer length to a standard 40 foot size to avoid those "big rig" issues, could, according to conventional RV construction processes, require reducing the cargo area to 10 feet in length, unless livability floor space was to be sacrificed.

Some RV manufacturers have attempted to solve these concerns and increase functionality of toy haulers (as well as other RVs facing similar issues) by using vertically movable drop down or fold up fixtures and/or lofts over part of the cargo area. These drop down and fold up fixtures can be, for example, bed or seating assemblies which do not take up floor space in the cargo area when in a stowed position. Normally, then, when the secondary vehicle is loaded with the cargo compartment or when those fixtures are not desired for use, the drop down bed, for example, would be stowed up and out of the way against the ceiling and consume no floor space. Of course, that bed would be unavailable to the user when the loaded vehicle was in motion or at a short stop along the road because the secondary vehicle would block its use.

Further, such drop down or fold up fixtures typically need to be supported, especially in the stowed position, by the side walls of the RV (the end or back wall of the RV typically being the movable ramp door). That support can require extra structural features and/or extra rigidity or side wall strength in manufacturing of the RV, and that, in turn can cause an undesirable increase in overall vehicle weight and cost. In addition, such fixtures may require special actuation equipment if motor driven or special safety equipment and/or user precautions and operational procedures to avoid user injury and/or damage to the RV or secondary vehicle, especially if manually actuated.

Further, because of the dirt, fuel fumes, etc. of the secondary vehicles when loaded into the cargo compartment, the cargo compartment is often separated from the living compartments of toy haulers by a wall structure, commonly containing a door between the two compartments. When the secondary vehicles are removed from the cargo compartment, the drop down or fold up fixtures can created another living compartment, but one that is still isolated by the dividing wall from the rest of the living compartments. That division can be aesthetically and functionally undesirable and, at least with respect to the provision of heating and air conditioning within the living compartments, required increased structural features and costs to make the temperature environment of the cargo compartment equivalent to that of the rest of the vehicle. Similarly, that compartment could require additional entertainment system components, since it would have restricted availability to those components servicing the rest of the vehicle, if that kind of functionality was desired vehicle-wide.

Accordingly, it is an object of the present invention to provide an improved RV. Other objects of the present invention include the provision of an RV having:
 a. an increased functionality to weight ratio,
 b. an increased functionality to length ratio,
 c. increased cargo space when cargo is loaded as well as increased livable space when cargo is unloaded without increasing the floorspace footprint of the vehicle, and
 d. the ability to change the floorspace ratio of different compartments.

SUMMARY OF THE INVENTION

The present invention provides a method of making a RV having a plurality of compartments whose floorspace ratio can be selectively altered according to the usage status of the vehicle without increasing the total floorspace footprint by internal movement of structural features and user fixtures normally supported on the vehicle floorspace. For example, an RV can be made wherein the relative position of a dividing wall between compartments is movable with respect to those compartments and, at the same time, a seating fixture within one compartment can be moved along the floor between optimizable positions according to the usable floor space within that compartment.

Other objects, advantages and novel features of the present invention will now become readily apparent from the following drawings and detailed description.

DETAILED DESCRIPTION OF PREFERRED EMBODIMENTS

Figure 1:
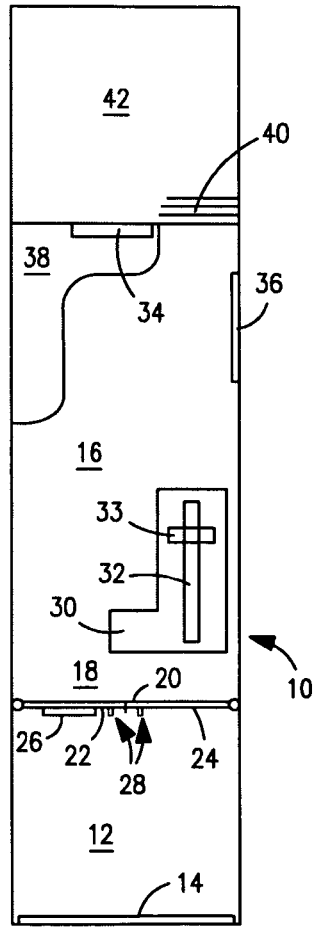
FIG. 1 shows a top schematic view of a first embodiment of the present invention as applied to the toy hauler type travel trailer, with the living and cargo compartments in a first position, favoring floorspace in the living compartment.

FIG. 1 shows preferred embodiment of the present invention as adopted by a toy hauler type of travel trailer. The trailer 10 may include a variety of slide outs and other features, but the present invention is illustrated most clearly with respect to only a few basic features. Trailer 10 includes a cargo compartment 12 at the rear of the trailer, having a ramp door 14 forming part of the back wall of the trailer. Trailer 10 also includes at least one living compartment 16 forward of the cargo compartment and having at least portion 18 of its floorspace being shared in common with cargo compartment 12, depending upon the usage mode of the trailer.

Figure 2:
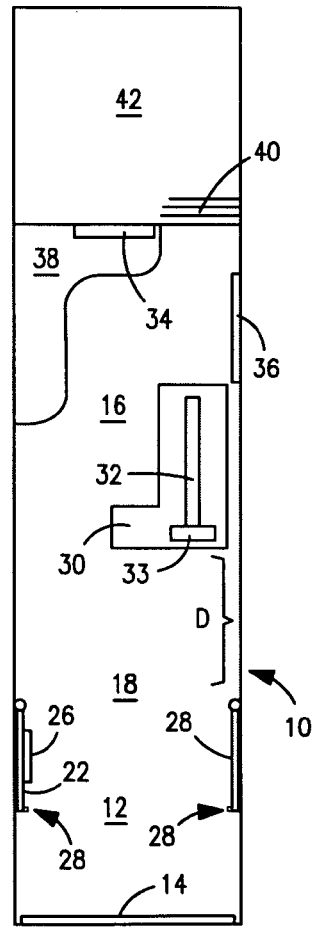
FIG. 2 shows a top schematic view of the embodiment of FIG. 1 with the living and cargo compartments in a second position, favoring floorspace in the cargo compartment.

Living compartment 16 and cargo compartment 12 are separated in FIG. 1 by a dividing wall 20, which is, for example, formed from two sections 22 and 24. Each of those sections is pivotally mounted to the side walls of the trailer. Section 22 includes therein a door 26. Each section includes a position locking mechanism 28, such as a retaining pin, for retaining it in a desired location, closed as shown in FIG. 1 and open as shown in FIG. 2.

Living compartment 16 includes a seating fixture 30, which is, for example, a sofa or bench seat type assembly that is supported by the floor of the living compartment. Fixture 30 is mounted to a track assembly 32 which is attached to the floor. This track assembly is, for example, similar in structure to conventional tracks used for RV slide out assemblies except that its bracketry for holding fixture 30 is modified to fit the understructure of the fixture and that its length has been increased to permit motion of fixture 30 over a longer distance as needed for whatever change in floorspace between the living and cargo compartments is desired in a given application. Track assembly 32 is, for example, driven by a conventional slide out track motor 33 and can also be actuated manually or remotely in a conventional manner as prior slide out assemblies. Living compartment 16 also includes, for example, a large, wall mounted television 34, an exit door 36, a kitchen countertop area 38, and steps 40 leading to another living compartment 42.

Fixture 30 is movable by track assembly 32 whatever distance D is desired to increase the usable floor space of cargo compartment 12 when dividing wall 22 is opened. In general, however, fixture 30 should not be move so far forward as to block door 36 so that living compartment 16 remains fulling accessible and usable regardless of whether a secondary vehicle is within cargo compartment 12 or not. Thus, a RV build by a process of providing these features will permit the advantages sought by this invention.

Figure 3:
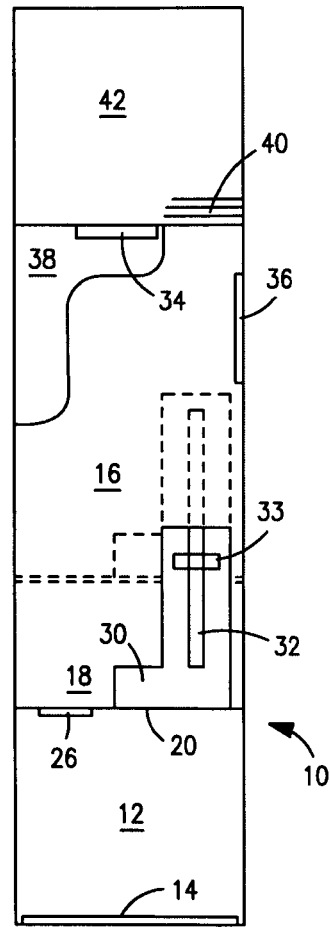
FIG. 3 shows a top schematic view of a second embodiment of the present invention as applied to a toy hauler type travel trailer.

In the alternative embodiment of FIG. 3, the fixture 30 and dividing wall 22 are attached to each other and both are moved by track assembly 32 between the solid line position and the dashed line position such that there is always a dividing wall between the living and cargo compartments.

What is claimed is:

1. A process of increasing the functionality/weight ratio or the functionality/length ratio of a recreational vehicle comprising the steps of:
    a. establishing the footprint of the recreational vehicle during manufacture,
    b. selecting an initial floor plan within that footprint having at least a first and a second separately defined compartment, each with an initial floor space and structural features,
    c. providing the first compartment with at least one fixture which is movable between at least a first and second predetermined location, the at least one fixture being directly connected to at least one of the structural features
    d. providing means directly connected to the at least one fixture operable to move the at least one fixture between at least the first and second predetermined locations; and
    e. wherein operation of the means directly connected to the at least one fixture directly imparts movement to the at least one fixture and movement of the at least one fixture directly imparts movement to the structural features of the first compartment to which the at least one fixture is directly connected such that the ratio of the floorspace of the first compartment changes with respect to the floorspace of the second compartment without changing the footprint.

2. The process according to claim 1 wherein the fixture occupies a first area of the floorspace in the first compartment when the fixture is in the first predetermined location and occupies a second area of the floorspace in the first compartment equal to the first area when the fixture is in the second predetermined location.

3. A recreational vehicle comprising:
    a cargo compartment for enclosing removable cargo,
    a living compartment, for providing a weather sheltered enclosure, having a dividing wall separating the cargo compartment from the living compartment,
    the living compartment containing at least one fixture for facilitating use of the living compartment, that fixture being directly connected to the dividing wall and occupying a given amount of floorspace and movable between at least two predetermined locations,
    means directly connected to the fixture operable to directly impart motion to the fixture to move the fixture between the at least two predetermined locations such that the fixture directly imparts motion to the dividing wall to move the dividing wall between at least a first and a second predetermined location, and
    movement of the fixture and the wall between their respective first and second locations alters the ratio of the floorspace between the cargo and living compartments.

4. The recreational vehicle according to claim 3 wherein:
    the vehicle is constructed in a toy hauler format having a ramp door forming a wall of the cargo component,
    the living compartment is formed forward of the cargo compartment and the dividing wall forms the back wall of the living compartment, the cargo compartment and living compartment sharing a common floor portion, and
    the movable fixture is a seating assembly which is mounted on a track attached to the floor of the living compartment and which is movable along that track between a forward and rearward position.

5. The recreational vehicle according to claim 4 wherein:
    the dividing wall is movably positioned with respect to the sides of the vehicle and movable between a first position wherein the cargo compartment has a first volume, and a second position wherein the cargo compartment has a second volume, that first volume being smaller than the second volume.

6. The recreational vehicle according to claim 5 wherein:
    the dividing wall is formed in two parts, each pivotably connected to a side of the vehicle and able to move between an open position and a closed position, and includes means for selectively retaining each part in either the open or closed position.

7. The process according to claim 1, wherein the at least one fixture remains in contact with the floor of the recreational vehicle while moving from the first predetermined location to the second predetermined location.

8. The process according to claim 1, wherein the means operable to move the at least one fixture between at least the first and second predetermined locations is located entirely beneath the at least one fixture when the at least one fixture is in the first predetermined location.

9. The process according to claim 8, wherein the means operable to move the at least one fixture between at least the first and second predetermined locations is partially located beneath the at least one fixture and partially exposed to the interior of the recreational vehicle when the at least one fixture is in the second predetermined location.

10. The recreational vehicle according to claim 3, wherein the fixture remains in contact with the floor of the recreational vehicle while moving between the at least two predetermined locations.

11. The recreational vehicle according to claim 3, wherein the means operable to move the fixture between the at least two predetermined locations is located entirely beneath the fixture when the fixture is in one of the predetermined locations.

12. The recreational vehicle according to claim 11, wherein the means operable to move the fixture between the at least two predetermined locations is partially located beneath the fixture and partially exposed to the interior of the recreational vehicle when the fixture is located between the at least two predetermined locations.

\* \* \* \* \*